(12) United States Patent
Brooks et al.

(10) Patent No.: US 12,648,555 B2
(45) Date of Patent: Jun. 9, 2026

(54) SYSTEM AND METHOD FOR AN AGRICULTURAL VEHICLE

(71) Applicant: CNH Industrial America LLC, New Holland, PA (US)

(72) Inventors: Nathan Paul Brooks, Manitowoc, WI (US); Jose Batz-Alvarado, Lyons, IL (US); Steven Winkel, Elkhart Lake, WI (US)

(73) Assignee: CNH Industrial America LLC, New Holland, PA (US)

( * ) Notice: Subject to any disclaimer, the term of this patent is extended or adjusted under 35 U.S.C. 154(b) by 166 days.

(21) Appl. No.: 17/975,134

(22) Filed: Oct. 27, 2022

(65) Prior Publication Data

US 2024/0138395 A1     May 2, 2024

(51) Int. Cl.
| | |
|---|---|
| *A01M 7/00* | (2006.01) |
| *A01C 23/00* | (2006.01) |
| *A01C 23/04* | (2006.01) |

(52) U.S. Cl.
CPC ......... *A01M 7/0089* (2013.01); *A01C 23/007* (2013.01); *A01M 7/0057* (2013.01); *A01C 23/047* (2013.01); *A01M 7/0042* (2013.01)

(58) Field of Classification Search
CPC .. A01C 23/007; A01C 23/047; A01M 7/0089; A01M 7/0057; A01M 7/0042
USPC .......................................................... 701/50
See application file for complete search history.

(56) References Cited

U.S. PATENT DOCUMENTS

| | | |
|---|---|---|
| 5,455,769 A | 10/1995 | Panoushek et al. |
| 7,467,352 B2 | 12/2008 | Arneson et al. |
| 8,626,406 B2 | 1/2014 | Schleicher et al. |
| 10,037,630 B2 | 7/2018 | So et al. |
| 10,150,483 B2 | 12/2018 | Procuniar et al. |
| 10,426,080 B2 | 10/2019 | Jugovich et al. |
| 10,719,289 B2 | 7/2020 | Di Federico et al. |
| 2010/0017075 A1* | 1/2010 | Beaujot ............... A01B 69/008 |
| | | 701/50 |
| 2014/0039697 A1 | 2/2014 | Weiler et al. |

(Continued)

FOREIGN PATENT DOCUMENTS

| | | |
|---|---|---|
| CN | 104956417 A | 9/2015 |
| EP | 2693281 B1 | 6/2018 |

OTHER PUBLICATIONS

George Adamides et al. "A Reality-Based Interaction Interface for an Agricultural Teleoperated Robot Sprayer" (10 pages) https://www.academia.edu/7166463/A_REALITY_BASED_INTERACTION_INTERFACE_FOR_AN_AGRICULTURAL_TELEOPERATED_ROBOT_SPRAYER.

(Continued)

*Primary Examiner* — Abby J Flynn
*Assistant Examiner* — Sean Patrick Reidy
(74) *Attorney, Agent, or Firm* — Dority & Manning. P.A.

(57) ABSTRACT

An agricultural system can include a product application system. A user interface can be operably coupled with the product application system. One or more sensors can be configured to capture data indicative of an object proximate to the user interface. A computing system can be communicatively coupled to the product application system and the one or more sensors. The computing system can be configured to detect an object based on the data from the one or more sensors and generate instructions for one or more components of the product application system to operate in an operational condition based on the detection of the object.

15 Claims, 6 Drawing Sheets

(56) References Cited

U.S. PATENT DOCUMENTS

| | | | |
|---|---|---|---|
| 2015/0257445 A1 | 9/2015 | Henry, Jr. et al. | |
| 2017/0113549 A1 | 4/2017 | Lucas et al. | |
| 2018/0277067 A1 | 9/2018 | Tentinger et al. | |
| 2018/0281549 A1* | 10/2018 | Kerner | B60G 17/019 |
| 2019/0225197 A1* | 7/2019 | Gomes | B60T 13/662 |
| 2019/0261585 A1 | 8/2019 | Weiler et al. | |
| 2019/0384321 A1* | 12/2019 | Nishi | B62D 49/06 |
| 2020/0398756 A1* | 12/2020 | Wezel | B60R 1/076 |
| 2021/0191434 A1 | 6/2021 | Lange et al. | |
| 2022/0010527 A1* | 1/2022 | Takeo | E02F 9/2228 |
| 2022/0062940 A1* | 3/2022 | Ferren | B05B 15/531 |

OTHER PUBLICATIONS

Z. Zhang et al. "Hardware and Software Design for Premixing In-Line Injection System Attached to Variable-Rate Orchard Sprayer" American Society of Agricultural and Biological Engineers vol. 63(4): 823-831 2020 (9 pages) https://sci-hub.hkvisa.net/10.13031/trans.13730.

"ISOBUS" User Guide John Deere 2013 (40 pages) https://www.deere.co.uk/common/docs/services_and_support/stellarsupport/en_R2/ag_management_solutions/guidance_and_machine_control/isobus/PFP13080_ISOBUS_User_Guide_EN.pdf.

* cited by examiner

SYSTEM AND METHOD FOR AN AGRICULTURAL VEHICLE

FIELD

The present disclosure generally relates to agricultural vehicles and, more particularly, to agricultural systems and methods for controlling various systems of the vehicle.

BACKGROUND

Agricultural work vehicles may perform various tasks within an agricultural field. For example, applicators (e.g., sprayers, floaters, etc.) may be used to deliver an agricultural product to a ground surface of a field. During operation, various user interfaces may be used to activate/deactivate and/or alter the operational conditions of various systems of the vehicle. Accordingly, an improved system and method for utilizing the user interfaces of an agricultural vehicle would be welcomed in the technology.

BRIEF DESCRIPTION

Aspects and advantages of the technology will be set forth in part in the following description, or may be obvious from the description, or may be learned through practice of the technology.

In some aspects, the present subject matter is directed to an agricultural system that includes a product application system. A user interface is operably coupled with the product application system. One or more sensors is configured to capture data indicative of an object proximate to the user interface. A computing system communicatively is coupled to the product application system and the one or more sensors. The computing system is configured to detect an object based on the data from the one or more sensors and to generate instructions for one or more components of the product application system to operate in an operational condition based on the detection of the object.

In some aspects, the present subject matter is directed to a method for operating an agricultural vehicle. The method includes capturing data, from one or more sensors, indicative of an area proximate to a user interface. The method also includes detecting, with a computing system, an object within the area proximate to the user interface. Lastly, the method includes generating, with the computing system, instructions for one or more components of a product application system to operate in an operational condition based on the detection of the object.

In some aspects, the present subject matter is directed to an agricultural system that includes a drive system configured to move an agricultural vehicle. A user interface is operably coupled with the drive system. A housing is operably supporting the user interface. One or more sensors is configured to capture data indicative of a position of a housing supporting the user interface. A computing system is communicatively coupled to the drive system and the one or more sensors. The computing system is configured to detect whether the user interface is in a stored position or an access position, the user interface accessible from a position external to a cab of the vehicle in the access position and generate instructions for one or more components of the drive system to operate in an operational condition based on the housing being in the access position.

These and other features, aspects, and advantages of the present technology will become better understood with reference to the following description and appended claims.

The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present technology, including the best mode thereof, directed to one of ordinary skill in the art, is set forth in the specification, which makes reference to the appended figures, in which.

Figure 1:
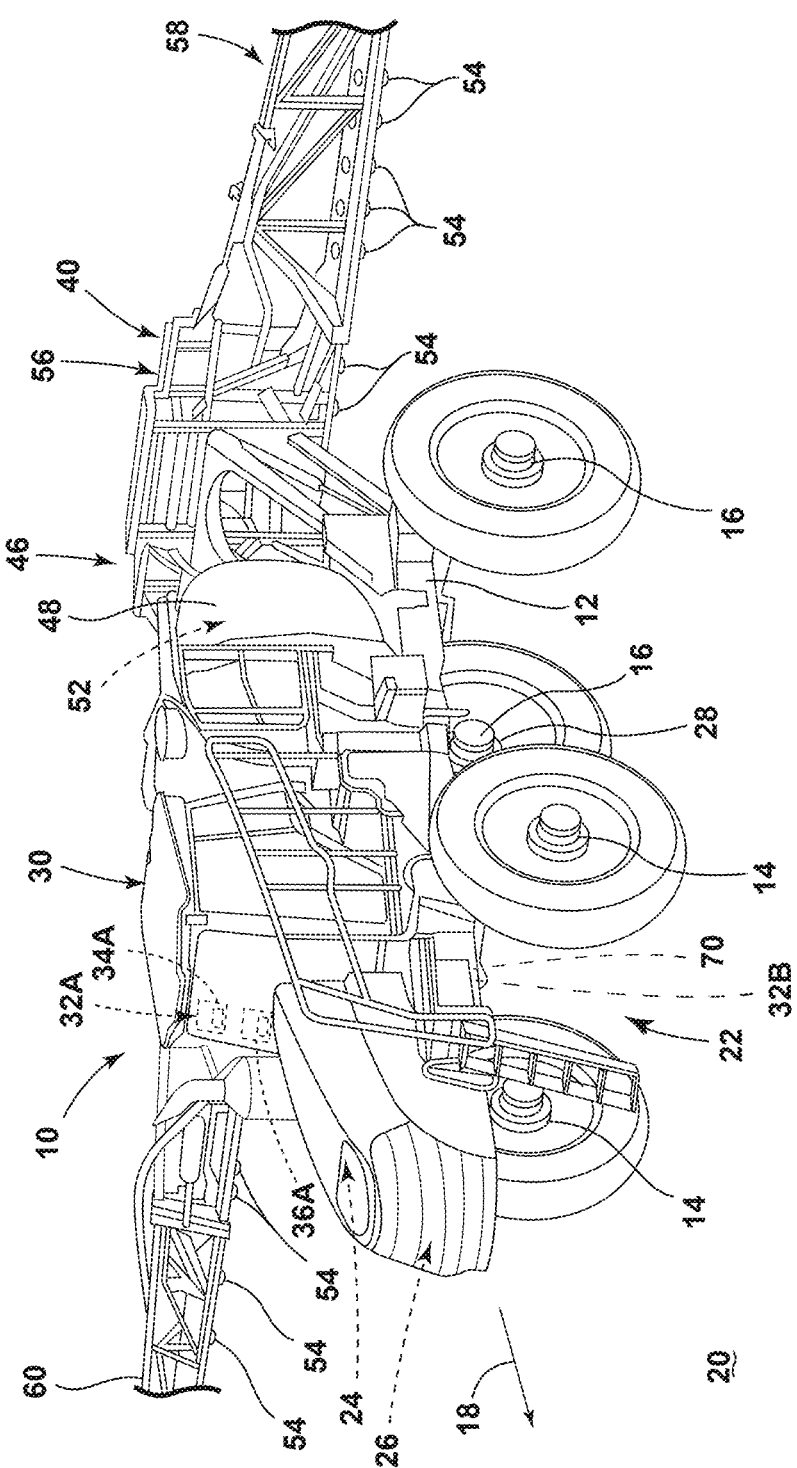
FIG. 1 illustrates a perspective view of an agricultural work vehicle in accordance with aspects of the present subject matter.

Repeat use of reference characters in the present specification and drawings is intended to represent the same or analogous features or elements of the present technology.

DETAILED DESCRIPTION

Reference now will be made in detail to embodiments of the disclosure, one or more examples of which are illustrated in the drawings. Each example is provided by way of explanation of the discourse, not limitation of the disclosure. In fact, it will be apparent to those skilled in the art that various modifications and variations can be made in the present disclosure without departing from the scope or spirit of the disclosure. For instance, features illustrated or described as part can be used with another embodiment to yield a still further embodiment. Thus, it is intended that the present disclosure covers such modifications and variations so as to come within the scope of the appended claims and their equivalents.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the terms "first," "second," and "third" may be used interchangeably to distinguish one component from another and are not intended to signify a location or importance of the individual components. The terms "coupled," "fixed," "attached to," and the like refer to both direct coupling, fixing, or attaching, as well as indirect coupling, fixing, or attaching through one or more interme-
diate components or features, unless otherwise specified
herein. The terms "upstream" and "downstream" refer to the
relative direction with respect to an agricultural product
within a fluid circuit. For example, "upstream" refers to the
direction from which an agricultural product flows, and
"downstream" refers to the direction to which the agricul-
tural product moves. The term "selectively" refers to a
component's ability to operate in various states (e.g., an ON
state and an OFF state) based on manual and/or automatic
control of the component.

Furthermore, any arrangement of components to achieve
the same functionality is effectively "associated" such that
the functionality is achieved. Hence, any two components
herein combined to achieve a particular functionality can be
seen as "associated with" each other such that the desired
functionality is achieved, irrespective of architectures or
intermedial components. Likewise, any two components so
associated can also be viewed as being "operably con-
nected" or "operably coupled" to each other to achieve the
desired functionality, and any two components capable of
being so associated can also be viewed as being "operably
couplable" to each other to achieve the desired functionality.
Some examples of operably couplable include, but are not
limited to, physically mateable, physically interacting com-
ponents, wirelessly interactable, wirelessly interacting com-
ponents, logically interacting, and/or logically interactable
components.

The singular forms "a," "an," and "the" include plural
references unless the context clearly dictates otherwise.

Approximating language, as used herein throughout the
specification and claims, is applied to modify any quantita-
tive representation that could permissibly vary without
resulting in a change in the basic function to which it is
related. Accordingly, a value modified by a term or terms,
such as "about," "approximately," "generally," and "sub-
stantially," is not to be limited to the precise value specified.
In at least some instances, the approximating language may
correspond to the precision of an instrument for measuring
the value, or the precision of the methods or apparatus for
constructing or manufacturing the components and/or sys-
tems. For example, the approximating language may refer to
being within a ten percent margin.

Moreover, the technology of the present application will
be described in relation to exemplary embodiments. The
word "exemplary" is used herein to mean "serving as an
example, instance, or illustration." Any embodiment
described herein as "exemplary" is not necessarily to be
construed as preferred or advantageous over other embodi-
ments. Additionally, unless specifically identified otherwise,
all embodiments described herein should be considered
exemplary.

As used herein, the term "and/or," when used in a list of
two or more items, means that any one of the listed items can
be employed by itself, or any combination of two or more of
the listed items can be employed. For example, if a com-
position or assembly is described as containing components
A, B, and/or C, the composition or assembly can contain A
alone; B alone; C alone; A and B in combination; A and C
in combination; B and C in combination; or A, B, and C in
combination.

In general, the present subject matter is directed to an
agricultural system that may be implemented within an
agricultural vehicle. The system can include a product
application system may be configured to dispense a product
from the product tank to a field via the various nozzle
assemblies spaced apart along the length of the boom assembly. Additionally or alternatively, the system can
include a drive system and/or any other system. The drive
system may be configured to control the operation of a
powertrain control system, a steering system, the vehicle
suspension system, and/or the like.

A user interface can be operably coupled with the product
application system and/or the drive system. The user inter-
face may provide messages and/or alerts to the user and/or
allow the user to interface with the vehicle's controller
through one or more user input devices.

One or more sensors may be operably coupled with the
product application system, the drive system, the user inter-
face, and/or any other component or system of the vehicle.
The one or more sensors may be capable of detecting the
position of a housing of the interface and/or one or more
objects proximate to the user interface. In some examples,
an operational condition of one or more systems of the
vehicle may be placed and/or maintained in a defined state,
and/or alteration of the operational condition of the one or
more systems may be prevented based on data provided
from the one or more sensors.

Figure 2:
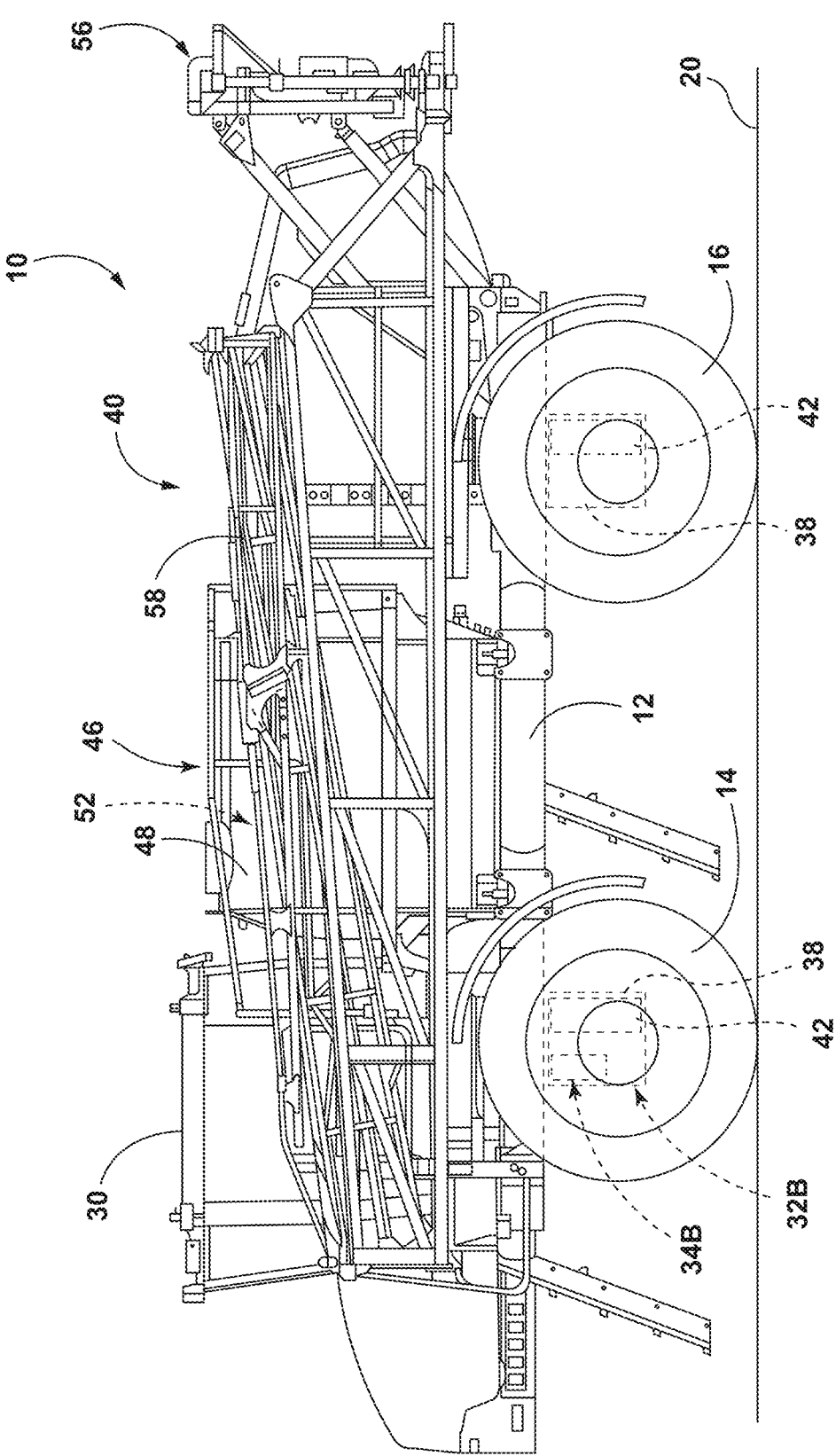
FIG. 2 illustrates a side view of the work vehicle in accordance with aspects of the present subject matter.

Referring now to FIGS. 1 and 2, a work vehicle 10 is
generally illustrated as a self-propelled agricultural applica-
tor. However, in alternate embodiments, the work vehicle 10
may be configured as any other suitable type of work vehicle
10 configured to perform any agricultural operation, such as
a tractor, harvester, or another vehicle.

In various embodiments, the work vehicle 10 may include
a chassis 12 configured to support or couple to a plurality of
components. For example, front and rear wheel assemblies
14, 16 may be coupled to the chassis 12. The wheel
assemblies 14, 16 may be configured to support the work
vehicle 10 relative to a field 20 and move the work vehicle
10 in a direction of travel (e.g., as indicated by arrow 18 in
FIG. 1) across the field 20. In this regard, the work vehicle
10 may include a powertrain control system 22 that includes
a power plant 24, such as an engine, a motor, or a hybrid
engine-motor combination, a hydraulic propel or transmis-
sion system 26 configured to transmit power from the engine
to the wheel assemblies 14, 16, and/or a brake system 28.

The chassis 12 may also support a cab 30, or any other
form of user's station, for permitting the user to control the
operation of the work vehicle 10. For instance, the work
vehicle 10 may include a first user interface 32A including
a display 34A for providing messages and/or alerts to the
user and/or for allowing the user to interface with the
vehicle's controller through one or more user input devices
36A (e.g., levers, pedals, control panels, buttons, and/or the
like) within the cab 30. Additionally or alternatively, the
work vehicle 10 may include a second user interface 32B
including a display 34B for providing messages and/or alerts
to the user and/or for allowing the user to interface with the
vehicle's components and systems externally of the cab 30.
While referred to as a "first" user interface and a "second"
user interface herein, it will be appreciated that the vehicle
10 may include solely the first user interface 32A or solely
the second user interface 32B without departing from the
teachings provided herein.

In some embodiments, to improve the agricultural product
application quality and/or operator comfort, the vehicle 10
can be equipped with a passive, semi-active, or active
suspension system 38 (FIG. 2) to dampen the movement of
the vehicle 10 during operation. For instance, the suspension
system 38 may be configured to isolate the cab 30 and/or a
boom assembly 40 from vibrations caused by uneven ter-
rain. In some examples, the suspension system 38 may be
adjustable thereby allowing for the height of the vehicle 10 above a ground surface to be adjusted. In some instances, the suspension system 38 may include an extensible strut 42 for connecting each of the four ground-engaging wheel assemblies 14, 16 of the vehicle 10 to the chassis 12 of the vehicle 10. The extensible strut 42 can control the height of the vehicle 10 above the ground surface by regulating a flow of pressurized air to the strut 42 to thereby control the extension/retraction of the strut 42 and a vertical distance between a rolling axis 44 (FIG. 4) of the wheel assemblies 14, 16 and the chassis 12 of the vehicle 10. In various examples, the suspension system 38 can include vibration isolators mounted between the chassis 12 and the wheel assemblies 14, 16 of the vehicle 10. For example, the suspension system 38 can be configured as a passive system that uses passive vibration isolators (e.g., rubber isolators, springs with friction, or viscous dampers) to dampen vibrations with different isolators to dampen different frequencies. Additionally or alternatively, the suspension system 38 can be configured as a semi-active system to achieve control and isolation between the chassis 12 and the cab 30 and/or the boom assembly 40 by controlling a damper to selectively remove energy from the system in response to the movement of the cab 30/boom assembly 40 (e.g., as monitored via sensors). Additionally or alternatively, the suspension system 38 can be configured as an active system that uses one or more sensors to sense movement and an associated controller or computing system to generate control signals for an actuator that applies a force to the cab 30 and/or the boom assembly 40 to cancel vibrations transmitted to the cab 30/boom assembly 40 by the chassis 12.

The boom assembly 40 mounted to the chassis 12. In addition, the chassis 12 may support a product application system 46 that includes one or more tanks, such as a product tank 48 and/or an auxiliary tank 50. The product tank 48 is generally configured to store or hold an agricultural product 52, such as a pesticide, a fungicide, a rodenticide, a nutrient, and/or the like. The agricultural product 52 is conveyed from the product tank 48 through plumbing components, such as interconnected pieces of tubing, for release onto the underlying field 20 (e.g., plants and/or soil) through one or more nozzle assemblies 54 mounted on the boom assembly 40.

As shown in FIGS. 1 and 2, the boom assembly 40 can include a frame 56 that supports first and second boom arms 58, 60, which may be orientated in a cantilevered nature. The first and second boom arms 58, 60 are generally movable between an operative or unfolded position (FIG. 1) and an inoperative or folded position (FIG. 2). When distributing the product, the first boom arm 58 and/or the second boom arm 60 extends laterally outward from the work vehicle 10 to cover swaths of the underlying field 20, as illustrated in FIG. 1. However, to facilitate transport, each boom arm 58, 60 of the boom assembly 40 may be independently folded forwardly or rearwardly into the inoperative position, thereby reducing the overall width of the vehicle 10, or in some examples, the overall width of a towable implement when the applicator is configured to be towed behind the work vehicle 10.

Figure 3:
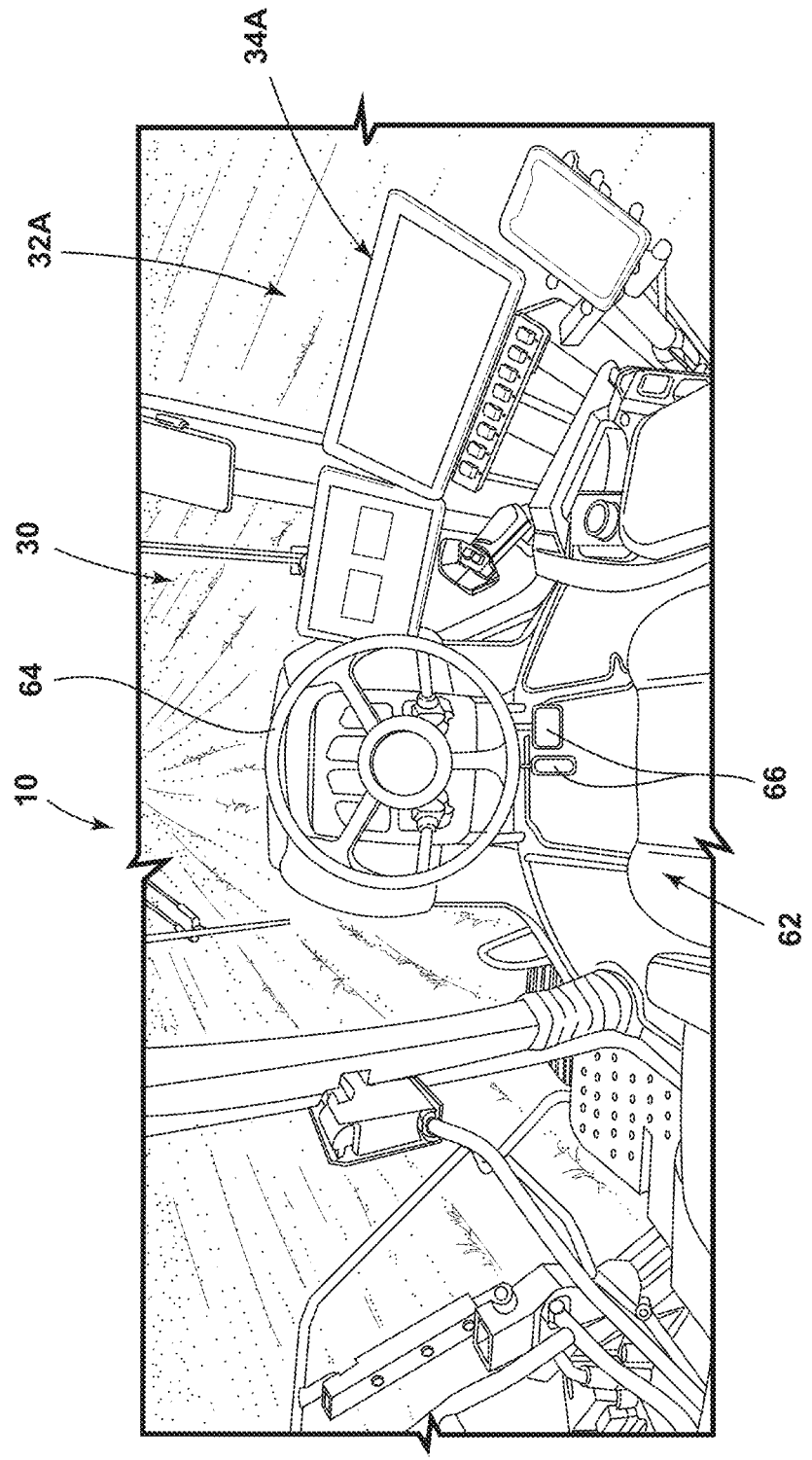
FIG. 3 is a perspective view of a cab of the vehicle in accordance with aspects of the present subject matter.

Referring to FIG. 3, an interior of the cab 30 of the work vehicle 10 may include a seat 62, on which the operator sits when operating the vehicle 10. In various embodiments, a steering wheel 64 is located near the seat 62, so as to be within arm's reach of the operator when the operator is seated. Though a steering wheel 64 is included in the illustrated example, other embodiments of the vehicle 10 may additionally or alternatively include other devices for receiving steering inputs from the operator. For example, in place of a steering wheel 64, the cab 30 may have left/right control bars, a hand controller, pedals, or another suitable device for receiving steering inputs. Also located near the seat 62, at the operator's feet, can be one or more pedals 66. The pedals 66 may be configured to receive input from the operator for controlling the speed of the vehicle 10. For example, the pedals 66 may control a throttle, brakes, a clutch, other suitable systems, or a combination thereof. Further, in embodiments in which the vehicle 10 is semi-autonomous or fully autonomous, the steering wheel 64, the seat 62, and/or the pedals 66 may be omitted.

As shown in FIG. 3, the first user interface 32A may be positioned within the cab 30 of the vehicle 10. In some examples, the first user interface 32A may be mounted within a cockpit module, an instrument cluster, and/or any other location within the cab 30. The first user interface 32A may be used to present information to the operator, such as vehicle information (e.g., ground speed, oil pressure, engine temperature, etc.), boom assembly 40 operations information (e.g., nozzle in use, agricultural product flow rate), and manufacturer proprietary systems information (e.g. Advanced Farming Systems (AFS) information, including yield maps, position data, etc.). In addition, the first user interface 32A may allow for activation and/or deactivation of various systems of the vehicle 10 by an operator. For instance, the first user interface 32A may be used to activate and/or deactivate the product application system 46 of the vehicle 10. Additionally or alternatively, the first user interface 32A may be used to alter an operational condition of a drive system 118 of the vehicle 10, and/or any other system of the vehicle 10.

Figure 4:
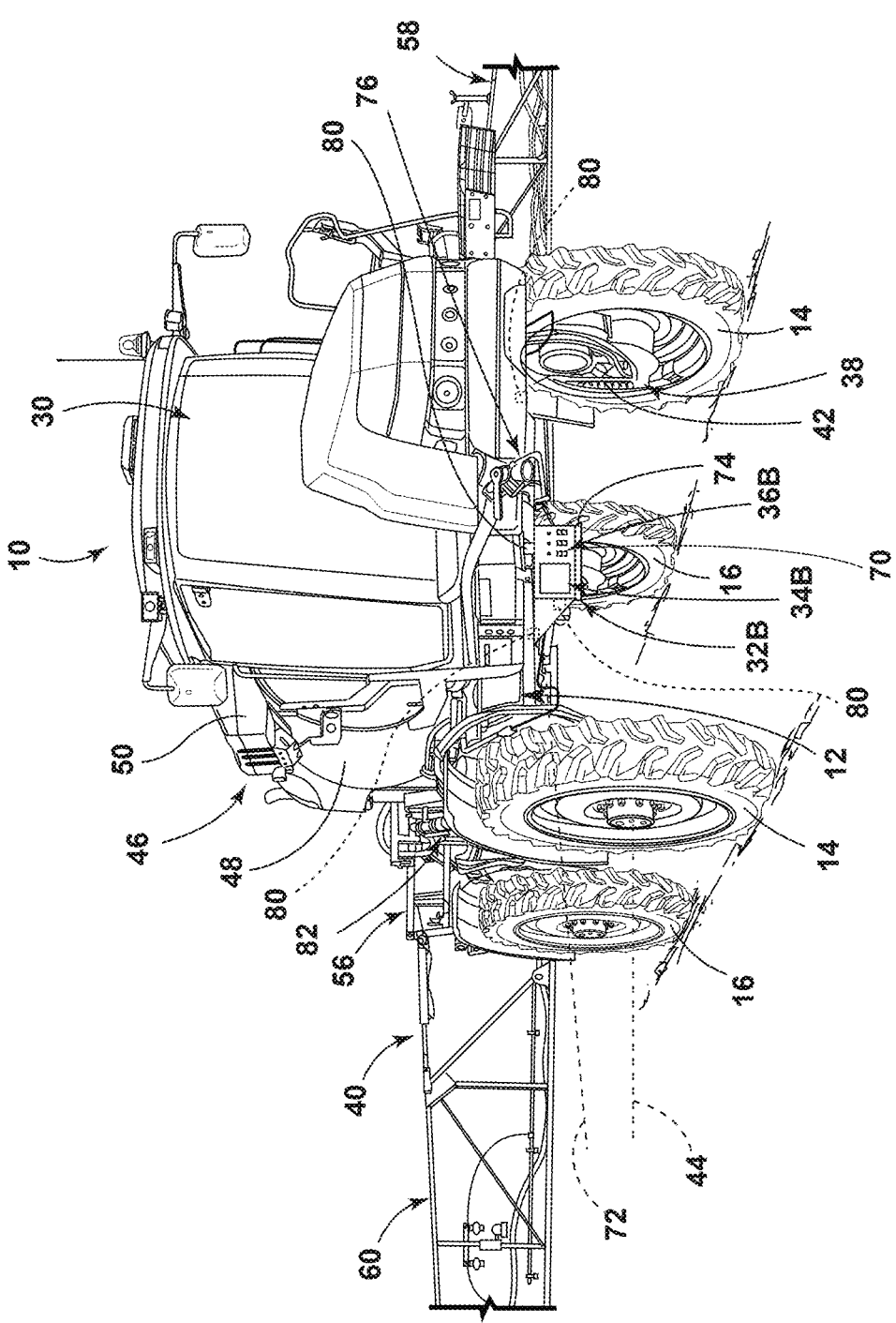
FIG. 4 illustrates a perspective view of an agricultural work vehicle in accordance with aspects of the present subject matter.

Referring to FIG. 4, the second user interface 32B may be accessible at a location that is external to the cab 30. For example, the second user interface 32B may be positioned at least partially below the cab 30, the chassis 12, and/or any other component of the vehicle 10. In various examples, the second user interface 32B may additionally or alternatively be located in any other position that is external from the cab 30 without departing from the scope of the present disclosure.

In some examples, such as the one provided in FIG. 4, the second user interface 32B may be operably coupled with a housing 70 that is movable between a stored position, as shown in FIG. 1, and an access position, as shown in FIG. 4. In some cases, the housing 70 may be rotated from the stored position to the access position about a pivot axis 72, which may be perpendicular to the direction of travel 18 of the vehicle 10 and/or the rolling axis 44. The housing 70 may further include a handle portion 74 on an opposing side portion of the housing 70 from the pivot axis 72. The handle portion 74 may be used to rotate between the stored position and the access position. Additionally or alternatively, the housing 70 may be moved between the stored position and the access position through one or more actuators. In such instances, a switch assembly may be used to move the housing 70 between the stored position and the access position, and the access position and the stored position.

In various examples, the second user interface 32B can include a display 34B for providing messages and/or alerts to the user and/or for allowing the user to interface with the vehicle's controller through one or more user input devices 36B (e.g., levers, control panels, buttons, and/or any other practicable device). In various examples, the second user interface 32B may be utilized in conjunction with a fill station 76 configured to receive the agricultural product that is to be delivered to the product tank 48 and/or the auxiliary tank 50. Additionally or alternatively, one or more other systems may be activated/deactivated and/or altered through the usage of the second user interface 32B.

The vehicle 10 may further include one or more sensors 80 that may be capable of detecting the position of the housing 70 of the second interface and/or one or more objects proximate to the second user interface 32B. The sensors 80 may include position sensors, flow sensors, motion sensors (e.g., accelerometers, gyroscopes, etc.), image sensors (e.g., cameras, LIDAR devices, etc.), radar sensors, ultrasonic sensors, and/or any other practicable sensor. In some examples, an operational condition of one or more systems of the vehicle 10 may be placed and/or maintained in a defined state, and/or alteration of the operational condition of the one or more systems may be prevented based on data provided from the one or more sensors 80. For example, a boom suspension 82 of the product application system 46 may be maintained at a fixed height, and/or prevented from lowering from a set height when the data provided from the one or more sensors 80 indicates that the housing 70 is in the access position and/or an object is proximate to the second user interface 32B. Additionally or alternatively, a suspension system 38 may be maintained at a fixed height, and/or prevented from lowering from a set height when the data provided from the one or more sensors 80 indicates that the housing 70 is in the access position and/or an object is proximate to the second user interface 32B. Any other operational condition may have defined constraints or settings based on the data provided from the one or more sensors 80 indicates that the housing 70 is in the access position and/or an object is proximate to the second user interface 32B. Additionally or alternatively, the operational conditions may have defined constraints or settings based on the data provided from the one or more sensors 80 indicating that an object is proximate to any other defined area surrounding the vehicle 10.

Figure 5:
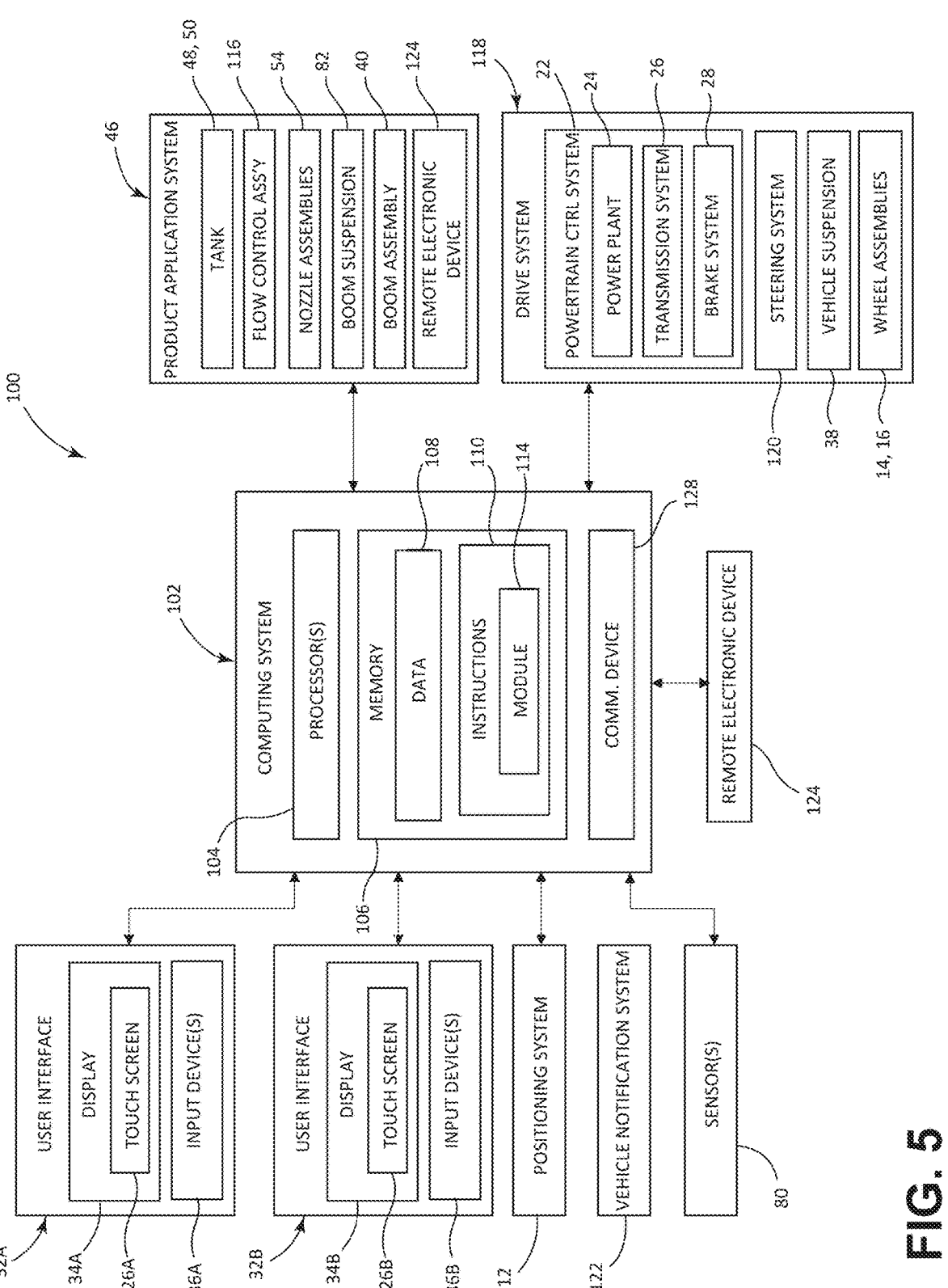
FIG. 5 illustrates a block diagram of components of an agricultural system in accordance with aspects of the present subject matter.

Referring now to FIG. 5, a schematic view of a system 100 for a work vehicle 10 is illustrated in accordance with aspects of the present subject matter. In general, the system 100 will be described with reference to the work vehicle 10 described above with reference to FIGS. 1-4. However, it will be appreciated by those of ordinary skill in the art that the disclosed system 100 may generally be utilized with agricultural machines having any other suitable machine configuration. Additionally, it will be appreciated that, for purposes of illustration, communicative links, or electrical couplings of the system 100 shown in FIG. 4 are indicated by bidirectional arrows.

In several embodiments, the system 100 may include a computing system 102 and various components, features, systems, and/or sub-systems configured to be communicatively coupled to the computing system 102. In general, the computing system 102 may be configured to perform various computer-related functions or tasks, including, for example, receiving data from one or more components, features, systems, and/or sub-systems of the vehicle 10, storing and/or processing data received or generated by the computing system 102, and/or controlling the operation of one or more components, features, systems and/or sub-systems of the vehicle 10.

In general, the computing system 102 may correspond to any suitable processor-based device(s), such as a computing device or any combination of computing devices. Thus, as shown in FIG. 5, the computing system 102 may generally include one or more processor(s) 104 and associated memory devices 106 configured to perform a variety of computer-implemented functions (e.g., performing the methods, steps, algorithms, calculations, and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device 106 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device 106 may generally be configured to store information accessible to the processor(s) 104, including data 108 that can be retrieved, manipulated, created, and/or stored by the processor(s) 104 and instructions 110 that can be executed by the processor(s) 104.

In several embodiments, the data 108 may be stored in one or more databases. For example, the memory device 106 may include various databases for storing data associated with the operation of the vehicle 10, such as operation data, sensor data, field data, map data, application data, agricultural product data, correlation tables, and/or the like. Such data may include, for example, information received from one or more components, features, systems, and/or sub-systems of the vehicle 10. For instance, as shown in FIG. 5, the computing system 102 may be communicatively coupled with one or more sensors 80. The one or more sensors 80 may be configured to generate data indicative of a housing position and/or an object proximate to the second user interface 32B. In some instances, the computing system may utilize one or more algorithms to determine whether an object is a field feature (plant, terrain feature, etc.) or a feature of interest (person, animal, and/or any other identifiable object of interest).

Additionally or alternatively, the computing system 102 may be communicatively coupled to a positioning system(s) 112 that is configured to determine the location of the vehicle 10 by using a global positioning system, a Galileo positioning system, the Global Navigation satellite system (GLONASS), the BeiDou Satellite Navigation and Positioning system, a dead reckoning system, and/or the like. In such embodiments, the location determined by the positioning system(s) 112 may be transmitted to the computing system 102 (e.g., in the form of location coordinates) and subsequently stored within a suitable database for subsequent processing and/or analysis.

Referring still to FIG. 5, in several embodiments, the instructions 110 stored within the memory device 106 of the computing system 102 may be executed by the processor(s) 104 to implement one or more modules 114, such as a data analysis module or an active control module. For example, a data analysis module may be executed or implemented by processor(s) 104 to analyze data received from one or more components, features, systems, and/or sub-systems of the vehicle 10 (e.g., the one or more sensors 80, etc.).

Additionally, an active control module may be executed or implemented by the processor(s) 104 to alter or adjust the operation of one or more components, features, systems, and/or sub-systems of the vehicle 10. For instance, in some embodiments, the computing system 102 may utilize the active control module to adjust or control the operation of one or more components of an agricultural product application system 46, such as by controlling the operation of an associated flow control assembly 116 (e.g., one or more pumps, valves, and/or the like) that regulates the supply of agricultural product between the tanks 48, 50 and the nozzle assemblies 54, by controlling the operation of the nozzle assemblies 54 (e.g., by controlling the nozzle valves using a pulse width modulation (PWM) technique), and/or by controlling any other suitable component of the agricultural product application system 46 (e.g., a boom suspension 82). In addition, various other components may be adjusted or controlled by the computing system 102 via execution or implementation of the active control module. For instance, the computing system 102 may be configured to adjust or control the operation of one or more components, subsystems, or systems of a drive system 118, such as by controlling the operation of the powertrain control system 22, a steering system 120, the vehicle suspension system 38, and/or the like.

The active control module may also be capable of providing notifications and/or instructions to the user interfaces 32A, 32B, a related vehicle notification system 122 (e.g., including components configured to provide visual, auditory, or haptic feedback, such as lights, speakers vibratory components, and/or the like), and/or an electronic device 124.

In some examples, the first user interface 32A may include a display 34A having a touchscreen 126A mounted within the cab 30. The display 34A may be capable of displaying information related to the operation of the vehicle 10 and/or systems or components operably coupled with the vehicle 10. In some embodiments, the display 34A may include an input device in the form of circuitry within the touchscreen 126A to receive an input corresponding with a location over the display 34A. Additionally, the first user interface 32A may also include various other types or forms of input devices 36A, such as one or more joysticks, buttons, knobs, levers, input pads, and/or any other practicable device.

Similarly, the second user interface 32B may include a display 34B having a touchscreen 126B mounted externally of the cab 30. The display 34B may be capable of displaying information related to the operation of the vehicle 10 and/or systems or components operably coupled with the vehicle 10. In some embodiments, the display 34B may include an input device in the form of circuitry within the touchscreen 126B to receive an input corresponding with a location over the display 34B. Additionally, the second user interface 32B may also include various other types or forms of input devices 36B, such as one or more joysticks, buttons, knobs, levers, input pads, and/or the like.

In several embodiments, the computing system 102 may be configured to communicate via wired and/or wireless communication with one or more remote electronic devices 124 through a communications device 128 (e.g., a transceiver). The network may be one or more of various wired or wireless communication mechanisms, including any combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary wireless communication networks include a wireless transceiver (e.g., a BLUETOOTH module, a ZIGBEE transceiver, a Wi-Fi transceiver, an IrDA transceiver, an RFID transceiver, etc.), local area networks (LAN), and/or wide area networks (WAN), including the Internet, providing data communication services. The electronic device 124 may include a display for displaying information to a user. For instance, the electronic device 124 may display one or more user interfaces and may be capable of receiving remote user inputs associated with adjusting operating variables or thresholds associated with the vehicle 10. In addition, the electronic device 124 may provide feedback information, such as visual, audible, and tactile alerts, and/or allow the operator to alter or adjust one or more components, features, systems, and/or sub-systems of the vehicle 10 through the usage of the remote electronic device 124. It will be appreciated that the electronic device 124 may be any one of a variety of computing devices and may include a processor and memory. For example, the electronic device 124 may be a cell phone, mobile communication device, key fob, wearable device (e.g., fitness band, watch, glasses, jewelry, wallet), apparel (e.g., a tee shirt, gloves, shoes, or other accessories), personal digital assistant, headphones and/or other devices that include capabilities for wireless communications and/or any wired communications protocols. Additionally or alternatively, the electronic device 124 may be configured as a rate control module (RCM) and/or any other module that may be implemented within the product application system 46 and/or any other system or component of the vehicle 10.

Referring still to FIG. 5, the agricultural product application system 46 may be configured to dispense a product from the product tank 48 to the field 20 via the various nozzle assemblies 54 spaced apart along the length of the boom assembly 40. In some embodiments, the flow control assembly 116 of the application system 46 can include a pump, restrictive orifices, valves, and/or the like to regulate the flow of agricultural product from the product tank 48 to the nozzle assemblies 54. In some cases, the flow control assembly 116 may regulate flow based on data provided by the one or more sensors 80. For instance, when the housing 70 is detected to be in the access position, the computing system 102 may generate instructions for one or more components of the product application system 46 to operate in an operational condition based on the detection of the object. Additionally or alternatively, when an object is detected to be proximate to the second user interface 32B and/or any other defined area proximate to the vehicle, the computing system 102 may generate instructions for one or more components of the product application system 46 to operate in an operational condition based on the detection of the object. For example, the instructions can include placing the flow control assembly 116 in a deactivated condition to inhibit dispensing of agricultural product from the one or more nozzles.

In some embodiments, the boom suspension 82 may be configured to dampen the movement of the boom frame 56 relative to a mast, thereby providing a more stable platform for the boom assembly 40. The boom suspension 82 may allow for various damping levels based on an operator input and/or such damping levels may be automatically altered or selected by the computing system 102 (e.g., based on data received from one or more sensors 80). In some embodiments, the boom suspension 82 may be automatically adjusted based on data received from another system or sub-systems of the vehicle 10 as well. For instance, when the housing 70 is detected to be in the access position, the computing system 102 may generate instructions to maintain the boom suspension 82 at a fixed height and/or prevent the boom suspension 82 from lowering below a minimum height. Additionally or alternatively, when an object is detected to be proximate to the second user interface 32B and/or any other defined area proximate to the vehicle 10, the computing system 102 may generate instructions to maintain the boom suspension 82 at a fixed height and/or prevent the boom suspension 82 from lowering below a set height. Additionally, or alternatively, the damping level of the boom assembly 40 may be adjusted based on the computing system 102 receiving instructions to alter the powertrain system 126 and/or the steering system 120 of the vehicle 10. Additionally, or alternatively, the damping level may be adjusted in response to data received from any other component, system, and/or sub-systems of the vehicle 10.

In some embodiments, the powertrain control system 22 includes a power plant 24, a transmission system 26, and a brake system 28. The power plant 24 is configured to vary the output of the engine to control the speed of the vehicle 10. For example, the power plant 24 may vary a throttle setting of the engine, a fuel/air mixture of the engine, a timing of the engine, and/or other suitable engine parameters to control engine output. In addition, the transmission system 26 may adjust a gear selection within a transmission system 26 to control the speed of the vehicle 10. Furthermore, the brake system 28 may adjust braking force, thereby controlling the speed of the vehicle 10. While the illustrated powertrain control system 22 includes the power plant 24, the transmission system 26, and the brake system 28, it will be appreciated that alternative embodiments may include one or two of these systems, in any suitable combination. Further embodiments may include a powertrain control system 22 having other and/or additional systems to facilitate adjusting the speed of the vehicle 10.

In various examples, when the housing 70 is detected to be in the access position, the computing system 102 may generate instructions to maintain the powertrain system in a non-drive condition (e.g., a stationary position). Additionally or alternatively, when an object is detected to be proximate to the second user interface 32B and/or any other defined area proximate to the vehicle 10, the computing system 102 may generate instructions to maintain the boom suspension 82 at a fixed height and/or prevent the boom suspension 82 from lowering from a set height.

In some examples, when the positioning system(s) 112 determines that the location of the vehicle 10 is within a first location, the computing system 102 may provide instructions to one or more systems of the vehicle 10 to operate in a first state. When the positioning system(s) 112 determines that the location of the vehicle 10 is within a second location, the computing system 102 may provide instructions to one or more systems of the vehicle to operate in a second state.

Figure 6:
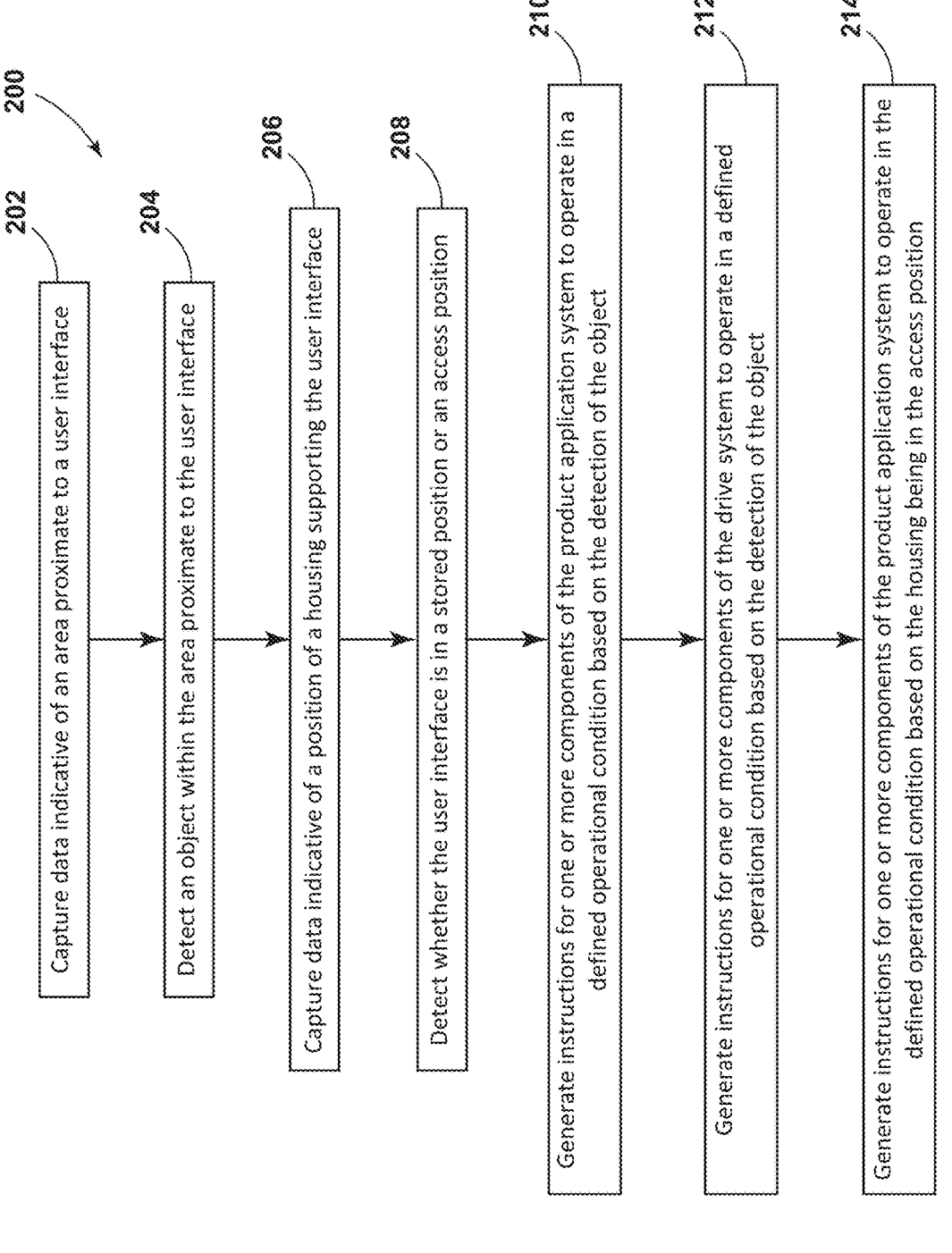
FIG. 6 illustrates a flow diagram of a method for an agricultural application operation in accordance with aspects of the present subject matter.

Referring now to FIG. 6, a flow diagram of some embodiments of a method 200 for operating an agricultural vehicle is illustrated in accordance with aspects of the present subject matter. In general, the method 200 will be described herein with reference to the work vehicle 10, and the system 100 described above with reference to FIGS. 1-5. However, the disclosed method 200 may generally be utilized with any suitable agricultural work vehicle 10 and/or may be utilized in connection with a system having any other suitable system configuration. In addition, although FIG. 6 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 6, at (202), the method 200 can include capturing data indicative of an area proximate to a user interface from one or more sensors. As provided herein, the user interface may be located externally from a cab of an agricultural vehicle. As such, an operator of the user interface may also be located proximately to the vehicle and outside of the cab. At (204), the method 200 can include detecting an object within the area proximate to the user interface with a computing system based on the data provided from the one or more sensors.

At (206), the method 200 can include capturing data indicative of a position of a housing supporting the user interface from the one or more sensors. At (208), the method 200 can include detecting whether the user interface is in a stored position or an access position with the computing system. As provided herein, the user interface can be accessible from a position external to the vehicle in the access position.

At (210), the method 200 can include generating instructions for one or more components of the product application system to operate in an operational condition based on the detection of the object. Additionally or alternatively, at (212), the method 200 can include generating instructions for one or more components of the drive system to operate in an operational condition based on the detection of the object. Additionally or alternatively, at (214), the method can include generating instructions for one or more components of the product application system to operate in the operational condition based on the housing being in the access position.

In various examples, the method 200 may implement machine learning methods and algorithms that utilize one or several vehicle learning techniques including, for example, decision tree learning, including, for example, random forest or conditional inference trees methods, neural networks, support vector machines, clustering, and Bayesian networks. These algorithms can include computer-executable code that can be retrieved by the computing system and/or through a network/cloud and may be used to evaluate and update the boom deflection model. In some instances, the vehicle learning engine may allow for changes to the boom deflection model to be performed without human intervention.

It is to be understood that the steps of any method disclosed herein may be performed by a computing system upon loading and executing software code or instructions which are tangibly stored on a tangible computer-readable medium, such as on a magnetic medium, e.g., a computer hard drive, an optical medium, e.g., an optical disc, solid-state memory, e.g., flash memory, or other storage media known in the art. Thus, any of the functionality performed by the computing system described herein, such as any of the disclosed methods, may be implemented in software code or instructions which are tangibly stored on a tangible computer-readable medium. The computing system loads the software code or instructions via a direct interface with the computer-readable medium or via a wired and/or wireless network. Upon loading and executing such software code or instructions by the controller, the computing system may perform any of the functionality of the computing system described herein, including any steps of the disclosed methods.

The term "software code" or "code" used herein refers to any instructions or set of instructions that influence the operation of a computer or controller. They may exist in a computer-executable form, such as vehicle code, which is the set of instructions and data directly executed by a computer's central processing unit or by a controller, or a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. An agricultural system comprising:
a product application system operably coupled to a chassis;
a cab operably coupled with the chassis;
a housing operably coupled with the chassis and configured to move between a stored position and an access position, the housing positioned vertically between the cab and a ground surface;
a user interface operably coupled with the housing, the user interface moveable with the housing between the stored position and the access position and accessible from a position external to the cab, wherein the user input interface includes a display positioned below the chassis in the access position and at least partially above the chassis in the stored position;
one or more sensors configured to capture data indicative of an object and a housing position; and
a computing system communicatively coupled to the product application system and the one or more sensors, the computing system being configured to:
determine the object to be a field feature or a feature of interest based on the data from the one or more sensors;
detect the housing in the access position; and
operate one or more components of the product application system to operate in a defined operational condition based on the detection of the feature of interest and the housing in the access position.

2. The system of claim 1, wherein the one or more components of the product application system includes one or more nozzle assemblies, and wherein the operational condition is a deactivated condition.

3. The system of claim 1, wherein the one or more components of the product application system includes a flow control assembly, and wherein the operational condition is a deactivated condition.

4. The system of claim 1, wherein the one or more components of the product application system includes a boom suspension assembly, and wherein the operational condition defines a minimum set height of a boom frame.

5. The system of claim 1, further comprising:
a powertrain control system configured to move the product application system, the user interface, and the one or more sensors through a field,
wherein the computing system is further configured to:
generate instructions for one or more components of the powertrain control system to operate in an operational condition based on the detection of the field feature or the feature of interest and the position of the housing in the stored position or the access position.

6. The system of claim 5, wherein the operational condition is a non-drive condition.

7. The system of claim 1,
wherein the user interface is accessible when the housing is in the access position.

8. The system of claim 1, wherein a boom suspension of the product application system is operated at a fixed height when the computing system detects the position of the housing is the access position.

9. The system of claim 1, wherein a suspension system is prevented from lowering from a set height when the computing system detects the position of the housing is the access position.

10. A method for an operating an agricultural vehicle, the method comprising:
receiving, via a first user interface in a cab, an input to rotate a housing positioned between the cab and a ground surface from a stored position to an access position about a pivot axis perpendicular to a direction of travel of the vehicle;
capturing data, from one or more sensors, indicative of an object;
determining, with a computing system, whether the object is a field feature or a feature of interest;
capturing data, from the one or more sensors, indicative of a housing position of the housing supporting a second user interface, the housing movable between a stored position and an access position;
determining, with the computing system, the position of the housing; and
operating, with the computing system, one or more components of a product application system in an operational condition with defined constraints based on the receipt of the input, detection of the feature of interest, and the housing being in the access position.

11. The method of claim 10, further comprising:
generating, with the computing system, instructions for a powertrain control system to operate in an operational condition based on the detection of the feature of interest.

12. An agricultural system comprising:
a powertrain control system operably coupled with a chassis and configured to move an agricultural vehicle;
a housing operably coupled with the chassis, the housing positioned vertically between a cab and the ground surface;
a user interface operably coupled with the housing, the user interface moveable with the housing between a stored position and an access position, the user interface accessible from a position external to the cab when in the access position;
one or more sensors configured to capture data indicative of the position of the housing supporting the user interface; and
a computing system communicatively coupled to the powertrain control system and the one or more sensors, the computing system being configured to:
detect whether the user interface is in the stored position or the access position; and
operate one or more components of the powertrain control system to operate in a defined state based on the housing being in the access position.

13. The agricultural system of claim 12, further comprising:
a product application system including one or more nozzle assemblies.

14. The agricultural system of claim 13, wherein the one or more sensors are further configured to capture data indicative of a field feature.

15. The agricultural system of claim 12, wherein the user interface is external to a cab of a vehicle.

* * * * *